United States Patent [19]

LaValley

[11] Patent Number: 4,522,716
[45] Date of Patent: Jun. 11, 1985

[54] SHOWER PIPES FOR ROTARY DRUM FILTER

[76] Inventor: Richard W. LaValley, 15512 NE. 28th Ave., Vancouver, Wash. 98665

[21] Appl. No.: 464,023

[22] Filed: Feb. 4, 1983

[51] Int. Cl.³ ............................................. B01D 33/38
[52] U.S. Cl. .................... 210/210; 210/217; 210/394; 210/409; 210/402; 239/556; 138/174
[58] Field of Search ............... 210/784, 210, 211, 213, 210/217, 326, 394, 402, 403, 404, 409, 411, 412; 239/521, 523, 548, 556; 138/174, 172, 119, 157, DIG. 2

[56] References Cited

U.S. PATENT DOCUMENTS

| | | | |
|---|---|---|---|
| 460,352 | 9/1891 | Reading | 239/521 |
| 782,680 | 2/1905 | Millspaugh | 239/521 |
| 1,788,779 | 1/1931 | Register | 239/523 |
| 2,396,826 | 3/1946 | Callan | 138/157 |
| 2,673,763 | 3/1954 | Dunn | 239/521 |
| 2,752,129 | 6/1956 | Modine | 138/157 |
| 2,826,248 | 3/1958 | Angel | 239/556 |
| 3,080,124 | 3/1963 | Rathmann | 239/523 |
| 3,099,696 | 7/1963 | Meek | 239/521 |
| 3,150,082 | 9/1964 | Rich | 210/395 |
| 3,363,774 | 1/1968 | Luthi | 210/404 |
| 3,893,628 | 7/1975 | McCollum | 239/521 |
| 4,217,935 | 8/1980 | Grendelman et al. | 138/174 |
| 4,248,716 | 2/1981 | LaValley | 210/402 |
| 4,276,169 | 6/1981 | Browne et al. | 210/404 |

Primary Examiner—Richard V. Fisher
Assistant Examiner—Wanda L. Millard
Attorney, Agent, or Firm—Klarquist, Sparkman, Campbell, Leigh & Whinston

[57] ABSTRACT

A shower pipe for a rotary drum filter has a square cross-sectional shape defined by top, bottom and side walls. The sidewalls and a pair of lengthwise-extending continuous diffusion flanges depending from the bottom wall of the pipe stiffen the pipe against sag for placement at a 12 o'clock position spanning the filter drum. The pipe is formed of fiberglass reinforced plastic in two longitudinally-divided hollow sections in a pair of mirror image, trough-like molds. Each section has a pair of interconnection flanges for mating the sections together. The interconnection flanges extend normally to the sidewalls to stiffen the pipe when the bottom wall of the pipe is vertically-oriented for placing the pipe at at 9 o'clock position along one side of the filter drum. Glass rods are secured in the interior corners of the pipe to provide diagonal rigidity, for placing the pipe at, e.g., a 10–11 o'clock position between the top and side of the filter drum. Before assembly of the sections, funnel-shaped discharge holes are formed in two staggered rows in the bottom wall of the lower section. The outer surface of the bottom wall is molded so that the diffusion flanges can be precisely aligned tangentially with the outlet side of the discharge holes.

19 Claims, 6 Drawing Figures

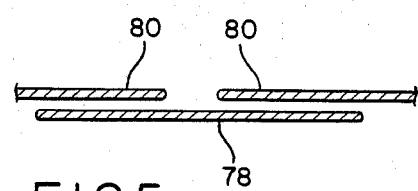
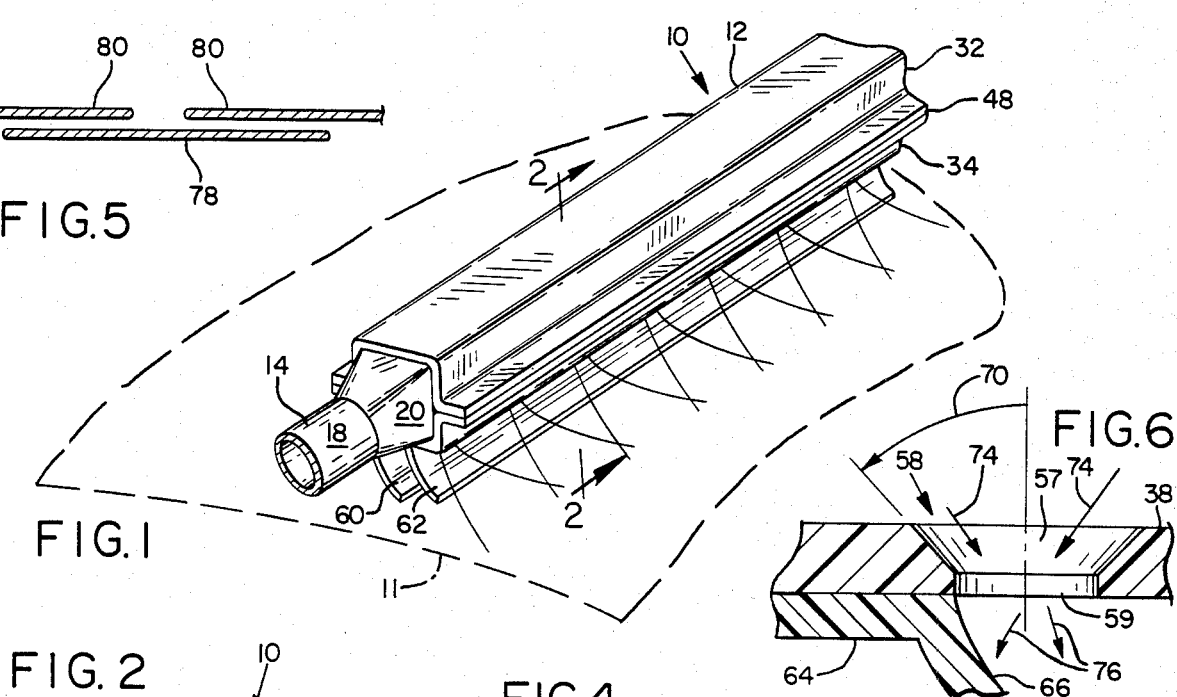
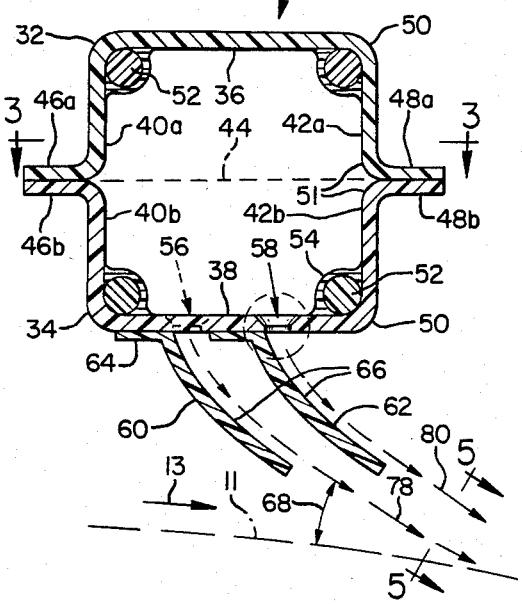
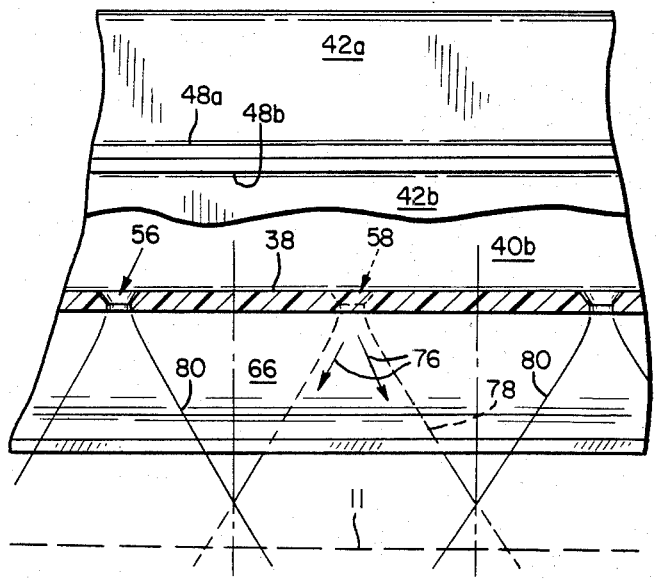
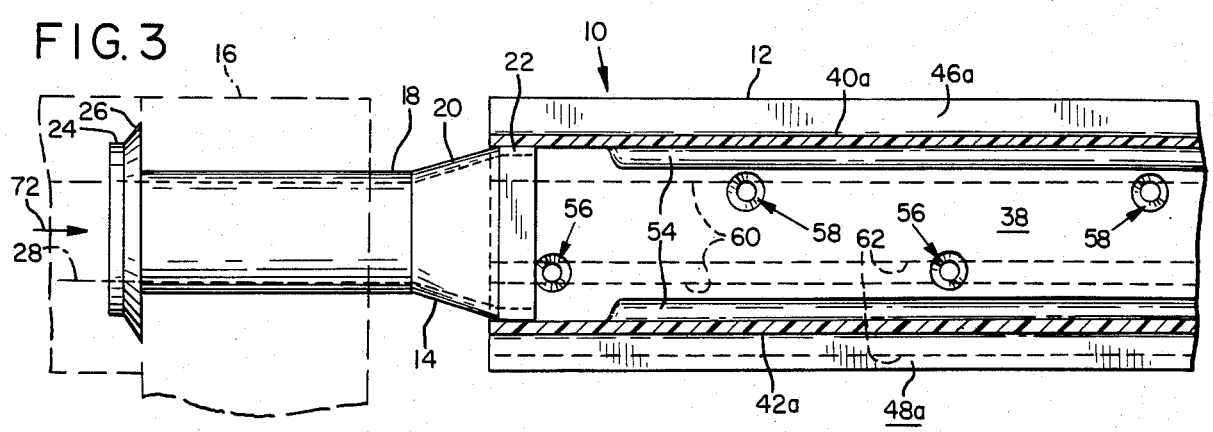

SHOWER PIPES FOR ROTARY DRUM FILTER

BACKGROUND OF THE INVENTION

The present invention relates generally to rotary drum filters and more particularly to shower pipes for such filters.

Rotary drum filters are well known and are commonly used, for example, in the pulp- and paper-making industry for separating wood pulp from pulp slurry. Such filters include a rotary drum partially submerged in a tank of pulp slurry. The drum surface is conventionally covered by a filter screen. As the screen rotates through the pulp slurry, a vacuum is applied within a portion of the drum, collecting a wet mat of fibers from the slurry on the screen. As the screen emerges from the tank, slurry liquid or filtrate is drawn inwardly through the screen by the vacuum and discharged through suitable piping, thereby removing the liquid from the mat. Examples of such filters are disclosed generally in U.S. Pat. No. 4,276,169 to Browne, et al., U.S. Pat. No. 4,248,716 to LaValley, U.S. Pat. No. 4,370,231 to LaValley, and in the patents cited therein.

Conventionally, about half a dozen parallel shower pipes are angularly spaced around a segment of the drum extending from just above the surface of the slurry to the top of the drum, proceeding in the direction of drum rotation. These pipes extend axially of the drum and are supported adjacent the ends of the drum. Washing liquid is discharged in a spray from the shower pipes to wash the pulp fibers as the mat emerges from the slurry. The pipes are spaced a fixed radial distance from the filter screen. This distance is preferably constant along the length of the pipes so that spray intensity and distribution are substantially uniform all the way across the mat. Examples of such shower pipes are disclosed in U.S. Pat. Nos. 3,150,082 to Rich and 3,363,774 to Luthi.

One persistent problem in the design and manufacture of rotary drum filters for use in pulp manufacture is the mitigation of corrosion. This problem has been overcome in part by making as many components of the filters as possible of corrosion-resistant material, such as fiberglass reinforced plastic. However, prior attempts at making shower pipes of fiberglass reinforced plastic have suffered from several drawbacks.

One drawback is a tendency of the pipes to sag. Conventional drum filters are very long, often 20 feet or more. To span the length of the drum, the shower pipes must be even longer. Such pipes are ordinarily supported only at their ends and, during operation, are filled with washing liquid. Consequently, they must be extremely stiff to minimize sagging between their ends. Prior shower pipes, constructed of fiberglass reinforced plastic alone and having a cylindrical cross section, are not sufficiently stiff to resist sagging.

Therefore, to increase stiffness in the vertical plane, it has been proposed to provide such pipes with a vertical fin or "stiff back" along one side. However, each pipe must be rotationally positioned so that its spray outlets or nozzles direct the spray against the mat at about the same angle of incidence. The rotational position thus varies with the angular position of each pipe around the drum. Applying a stiff back on all pipes in the same position relative to the spray outlets would defeat the purpose of the stiff back in the pipes that are rotationally positioned with stiff back approaching horizontal. Depending on pipe spacing, such positioning might also be precluded by interference between the stiff back of one pipe and an adjacent pipe. Hence, to be effective, this proposal would require making a different configuration pipe for each angular position around the drum.

Various shower pipe designs having steel angle members or stiffeners imbedded in the plastic at angular intervals around the pipe have also been tried, but still sag unacceptably. In one example, a 17 foot long cylindrical shower pipe, reinforced with three steel angle members, exhibited 15/32" sag when supporting a static load of 100 pounds midway between its ends. This is more sag than can be tolerated. Moreover, as this design of pipe is heated by the washing liquid, the steel stiffeners and fiberglass reinforced plastic expand differently, increasing both sag and the risk of cracking of the plastic or internal separation of the plastic and stiffeners due to thermal fatigue.

Another problem involves the spray pattern of washing liquid discharged from the shower pipes. It is desirable to wash the mat uniformly, necessitating continuous or overlapping spray coverage along the axial length of the drum. However, since the mat is typically thin and fragile, care must be taken to avoid tearing it with excessive localized spray intensity. Accordingly, a variety of different spraying arrangements have been proposed. One such arrangement uses a single row of spray holes spaced along the length of the pipe, together with some means for diffusing the spray from each hole to provide overlapping coverage. One form of diffusing means is a continuous lip or flange positioned along the row of holes and extending outwardly from the pipe diagonally across the holes to cause the spray from each hole to fan out. This approach is unsatisfactory because it concentrates too much spray pressure where overlapping adjacent fans of spray both strike the mat, often tearing the mat. Other forms of diffusing means include a whistle-type nozzle and a spoon-type diffuser positioned alongside each spray outlet. The latter forms of spray diffusers have also been tried in conjunction with double rows of longitudinally staggered holes. However, in practice, they do not provide sufficiently uniform spray coverage and are susceptible to plugging by fiber back-spattered from the mat into the spray outlets by the spray.

An additional disadvantage is the difficulty of making the foregoing shower pipe designs of fiberglass reinforced plastic using conventional manufacturing techniques. Heretofore, fiberglass reinforced plastic washer pipes have been formed on a cylindrical mandrel. Once a cylindrical pipe is formed, steel stiffeners are applied to its outer surface and overlain with additional fiberglass reinforced plastic material. Next, cylindrical spray holes are drilled in a row along a side of the pipe. Finally, a diffuser flange is positioned along the row of holes and secured to the pipe. This process produces a pipe having a rough and uneven outer surface. Such a surface precludes accurate positioning of the diffuser flange relative to the row of holes, thereby causing uneven diffusion of the spray. This process also renders virtually impossible the formation of complex shapes of spray holes or nozzles. And the resultant product has the functional drawbacks described above, namely, sagging and tearing the mat.

Accordingly, there remains a need for a shower pipe which does not sag, provides uniform spray coverage without plugging the shower pipe outlets or damaging the mat, and can be easily made of corrosion-resistant materials, such as fiberglass reinforced plastic.

SUMMARY OF THE INVENTION

Therefore, one object of the invention is to provide an improved design of shower pipe for rotary drum filters.

Another object of the invention is to improve the method of making such shower pipes.

A third object of the invention is to enable construction of shower pipes from fiberglass reinforced plastics so as to provide the structural and operational characteristics needed to uniformly wash without damaging a mat of pulp fiber in a rotary drum filter.

Another object is to construct an extremely stiff fiberglass reinforced plastic shower pipe which is substantially resistant to sag over great lengths and throughout its operational temperature range.

A further object of the invention as aforementioned is to construct such a shower pipe entirely of glass and plastic, in a single configuration and without using metal stiffeners.

Yet another object is to provide an improved spray outlet arrangement which will enable uniform washing of the mat without tearing it.

In accordance with the invention, the foregoing objects are realized in a shower pipe comprising a hollow pipe having a rectangular, preferably square, cross section so as to provide substantial rigidity against sagging between the ends of the pipe, regardless of rotational orientation along a rotary drum filter. In one aspect of the invention the pipe is stiffened by at least one (preferably two) continuous diffusion flanges extending axially along one side of the pipe and a pair of structural or interconnection flanges extending along opposite sides of the pipe. The diffusion flange is located to provide maximum stiffness to the pipe in one angular position and the structural or interconnection flanges are located to provide maximum stiffness when the pipe is in a second angular position, so that the pipe effectively resists sagging regardless of rotational position between such angles.

Such a pipe is preferably made by a process wherein longitudinally divided half sections of the pipe are separately formed in a trough-like mold to form a concave inner surface and a molded outer surface on each of the sections. The sections preferably include flat, lengthwise extending interconnection flanges on opposite sides of each section for mating the sections together with adjacent flanges in parallel abutting relationship. These flanges further stiffen the pipe when oriented nearly vertically. Prior to assembly of the sections, spray holes are formed in one of them, preferably with a decreasing diameter proceeding from the inner surface toward the outer surface thereof. Also prior to assembly of the sections, glass reinforcing rods are preferably secured lengthwise within the corners of each section to further stiffen the pipe against bowing.

In another aspect of the invention, the spray holes are preferably formed in two parallel, longitudinally staggered rows. A diffusion flange is positioned alongside each row so as to diffuse the discharges of liquid from each row of holes in different planes. In this way, overlapping spray coverage can be obtained without the spray from longitudinally adjacent holes striking the mat in the same location. The spray outlet holes preferably have a constricting frustoconical shape to diffuse or decollimate the discharge of liquid. The molded outer surface of the pipe enables precise positioning of the diffusion flanges along the spray holes so that the diffusing surfaces are tangential to the spray holes. The bulk of the liquid thus strikes the diffusion flange immediately upon exiting the holes, rather than at a distance spaced from the holes, as in prior designs. Broader dispersion of the spray lengthwise of the pipe is thereby obtained than in prior shower pipe spray arrangements. The spray holes and diffusion flanges are preferably positioned on the pipe so that the diffusion flanges stiffen the pipe in a dimension normal to the stiffening provided by the inconnection flanges.

The foregoing and other objects, features and advantages of the invention will become more readily apparent from the following detailed description of a preferred embodiment which proceeds with reference to the accompanying drawing.

BRIEF DESCRIPTION OF DRAWINGS

FIG. 1 is a top perspective view of one end of a shower pipe in accordance with the invention in position for washing a mat of fibrous pulp material carried on the screen of a rotary drum filter, the drum structure being omitted for clarity.

FIG. 2 is a cross-sectional view taken along lines 2—2 in FIG. 1.

FIG. 3 is a transverse sectional view taken along lines 3—3 in FIG. 2.

FIG. 4 is a front elevational view of the shower pipe of FIG. 1 with a lower portion of the pipe cut away along the front row of holes.

FIG. 5 is a view taken along lines 5—5 in FIG. 4, showing the spray distribution formed by the shower pipe just before the spray strikes the mat.

FIG. 6 is an enlargement of the circled portion of the view of FIG. 2 showing details of the spray hole and flange position.

DETAILED DESCRIPTION OF A PREFERRED EMBODIMENT

Referring to FIG. 1, shower pipe 10 comprises an elongated, square conduit or body 12 terminated at each end by a square-to-round reducer pipe 14. Referring to FIG. 3, the shower pipe is supported at each end by a bracket 16 structured to receive the cylindrical portion 18 of reducer 14. Bracket 16 is conventionally arranged to position pipe 10 at a fixed distance from mat 11, which is borne by the rotary drum (not shown) in a direction indicated in FIG. 2 by arrow 13. Connecting the cylindrical portion 18 of the reducer to the body of the shower pipe is a flared, square section 20, having a parallel-sided, square end portion 22 received within the end of body 12. A sealing flange 24 and backing ring 26 provide a sealed connection between the cylindrical end of the reducer pipe and a washing liquid input conduit 28.

Referring to FIG. 2, the body of shower pipe 10 is formed in upper and lower half sections 32, 34. The assembled body 12 has a square cross section defined by top and bottom walls 36, 38 and sidewalls 40, 42. Top wall 36 and upper portions 40a, 42a of the sidewalls are formed in the upper section 32. Bottom wall 38 and lower portions 40b, 42b of the sidewalls are formed in the lower section 34.

In terms of overall configuration, the upper and lower sections 32, 34 are mirror images, shaped to mate together along a dividing plane 44 parallel to and spaced equidistantly between top wall 36 and bottom wall 38. The sections are connected together along such plane by parallel interconnection flanges 46, 48, which extend outwardly at right angles from sidewalls 40, 42 along the length of the pipe body. The walls of the upper and lower sections meet at generally rounded right angle corners, such as corners 50. Similarly, flanges 46, 48 are integrally connected to their respective sidewalls at rounded right angle corners 51. A reinforcing rod 52 is positioned inside the shower pipe within the interior of each corner 50 and secured therein by fiberglass reinforced plastic material 54.

A spray discharge system is formed in the bottom wall 38 of shower pipe body 12. This system includes two rows of outlet or spray holes 56, 58. These holes are closely spaced laterally of the pipe, as shown in FIG. 2. Referring to FIGS. 3 and 4, the holes of each row are spaced longitudinally apart, for example, 16 inches apart in each row. The holes are longitudinally staggered so that the holes in one row are positioned half way between the holes of the other row, so that, e.g., there are holes spaced 8″ apart along the length of the pipe. Referring to FIG. 6, the holes themselves have a funnel shape defined by a frustoconical upper portion 57 and a cylindrical lower portion 59.

Depending from the underside of bottom wall 38 are a pair of diffusion flanges 60, 62. These flanges are substantially identical in shape. Each flange has a flat base portion 64 providing a flat surface for mounting the flange on the flat underside of the pipe. The base portion of each flange forms a dogleg with the diffusion portion of the flange. The diffusion portion of each flange has a parabolic concavely-curved diffusion surface 66 extending generally downwardly and across each row of holes 56, 58. In cross section, as best seen in FIG. 6, surface 66 is parallel to spray hole portion 59 immediately adjacent the spray holes, is gently curved proceeding away from such holes, and gradually approaches a straight line at its end portion remote from such holes. Referring to FIG. 3, flanges 60,62 are laterally aligned with the spray holes 56,58 so as to position surfaces 66 tangential to the circumference of the cylindrical outlet portion 59 of the outlet holes. The flanges 60, 62 extend continuously along the entire length of the shower pipe body 12.

Method of Fabrication

Shower pipe 10 is preferably made of molded fiberglass reinforced plastic. Each section 32, 34 of the shower body is separately formed in a trough-like mold (not shown) contoured to mold the outer surface of each section in a generally rectangular configuration with rounded corners 50, 51 at the intersections of the sidewalls and the flanges. The fiberglass reinforced plastic material is manually applied to the mold to a thickness suitable to provide structural strength commensurate with the overall dimensions of the shower pipe. In one example, the shower pipe has external cross-sectional dimensions of 6 inches ×6 inches and the walls are ¼ inch thick. The plastic resins and fiberglass materials used in fabricating sections 32, 34 are known in the art. Flanges 60, 62 are molded in similar fashion, with diffusing surfaces 66 being molded surfaces.

A continuous glass strand or rod 52 is next positioned in each interior corner 50 of each section 32, 34. Fiberglass reinforced plastic material 54 is laid on over the glass rod to secure it to the interior surfaces of the walls of the shower pipe body. In the foregoing example, rods 52 have a diameter of $\frac{7}{8}$ inch.

Next, spray holes 56, 58 are formed in the bottom wall 38 of lower section 34. Such holes are formed by drilling, using a suitable template, from the inner or upwardly-facing side of wall 38 toward the outer or lower side thereof. First, a pilot hole is drilled using a straight-sided bit of the diameter of portion 59. Then, a conical bit is used to form portion 57 concentrically with portion 59. The angle of the conical portion of the holes, indicated by arrow 70, is preferably about 41°. In the foregoing example, the rows of holes are laterally spaced, center to center, $1\frac{5}{8}$ inches apart and the holes in each row are 16 inches apart. The holes have a minimum diameter in cylindrical portion 59 of one half inch.

The next step is to assemble upper and lower sections 32, 34 and to apply flanges 60, 62 to the underside of wall 38, adjacent rows of holes 56, 58, respectively. The sections are joined along flanges 46, 48 using conventional putty material. Diffusion flanges 60, 62 are connected to bottom wall 38, continuously along its length, in like fashion. With the shower body assembled, square-to-round reducer 14 is inserted in each end of the shower body and secured therein.

Operation

Shower pipe 10 is next installed on a rotary drum filter by mounting its ends in bracket 16 and connecting it to conduit 28. Those skilled in the art will readily appreciate that a plurality of such pipes will be angularly spaced around a quadrant of the drum. Each pipe is connected to a liquid input manifold, of which conduit 28 forms a single branch. Each pipe is rotationally positioned in its respective bracket 16 to discharge a spray at a selected angle 68 from the mat 11. Thus, pipe 10 is rotationally positioned as shown in FIGS. 1 and 2, for use at the top or 12 o'clock position on the drum. In that position, diffusion flanges 66 assist side walls 40,42 in stiffening the pipe to resist sagging. Another such pipe located near the 9 o'clock position on the drum would be rotated counterclockwise nearly 90° from the position shown in FIG. 2. In the latter position, flanges 46, 48 are oriented nearly vertically to assist top and bottom walls 36,38 in stiffening the pipe against sagging. In pipes located at intermediate positions, for example, the 10:30 position, the interconnection flanges and the glass strands nearest to vertical alignment jointly stiffen the pipe. The foregoing example of shower pipe 10, in a length of 20 feet, supports a 400 pound load at its center with only $\frac{1}{8}$ inch deflection or sag. Also, when operated within the normal range of thermal conditions, deflection or sag does not vary measurably.

In operation, washing fluid is introduced into the shower pipe through conduit 28, as indicated by arrow 72. This liquid is discharged under pressure through holes 56, 58. The funnel shape of the holes tends to accelerate the velocity of fluid discharge to a maximum at cylindrical outlet portion 59. This shape also causes the water to flow diagonally, as well as vertically downwardly, toward the narrowest part of the discharge opening, as indicated by arrows 74 in FIG. 6. The vertical dimension of cylindrical portion 59 is small, for example, 1/32 to 1/16 inch, relative to its diameter, and so does not tend to appreciably collimate the discharge flow of liquid. As a result, the foregoing hole configuration provides a slightly divergent discharge flow, as indicated by arrows 76 in FIGS. 4 and 6.

The discharge flow further diffuses laterally as it flows down surface 66, to form generally fan-shaped flow patterns 78, 80. The combined action of the configuration of discharge holes, the parabolic shape of the diffusing surfaces, and the positioning of such surfaces immediately adjacent the holes, widely and uniformly disperses the discharge flows 78, 80 from such holes, as best seen in FIG. 5. The sprays from adjacent holes in the same row overlap much of the offset spray from a hole between them in the other row, but do not themselves overlap. In one example, with the discharge holes in each row spaced 16 inches apart, or a staggered spacing of 8 inches, the width of each fan pattern 78, 80 just above the mat 11 is 12-14 inches. In comparable prior shower pipes, the fan patterns are typically about 8 inches wide. The invention thus provides better dispersal and greater spray overlap with less chance of tearing the mat.

Having illustrated and described the principles of our invention in a preferred embodiment, it should be readily apparent to those skilled in the art that the invention can be modified in arrangement and detail without departing from such principles. We claim all such modifications as come within the spirit and scope of the following claims.

We claim:

1. A shower pipe for a rotary drum filter comprising:
   a rigid elongate pipe for spanning the length of a filter drum, said pipe being of rectangular cross section;
   means defining a first row of spray holes extending in spaced apart relationship axially along said pipe, the holes extending through an outer wall of the pipe for discharging a first liquid spray line along the length of the pipe when said pipe is filled with a liquid under pressure;
   means defining a second row of said spray holes extending in spaced apart relationship parallel to said first row, the second row being in the same quadrant of said pipe as the first row, for discharging a second liquid spray line along the length of the pipe and close to said first line; and
   a pair of diffusion flange means depending from the pipe, one flange means extending lengthwise of the pipe along each row of holes and joining the pipe adjacent to each said row, the pair of flange means being circumferentially closely spaced apart to diffuse said first and second liquid spray lines lengthwise of the pipe into two separate, circumferentially-spaced, but closely positioned, axially-diffused sprays of liquid which extend in the same direction from the pipe;
   the spray holes in said second row being axially spaced between the holes of the first row so that the axially diffused sprays of liquid in the first spray line are axially spaced apart from one another but axially overlap the diffused sprays in the second spray line.

2. A shower pipe according to claim 1 in which each of said flange means has a diffusing surface flush with a lateral side of the outlet openings of its respective row of spray holes and extending generally diagonally across said holes, so that a discharge of liquid from the holes impinges said surface immediately adjacent the outlet openings so as to begin to diffuse said liquid immediately upon emission from said openings.

3. A shower pipe according to claim 2 in which each of said spray holes is defined by a frustoconical sidewall having a decreasing diameter proceeding outwardly from inside the pipe toward the outlet opening.

4. A shower pipe according to claim 3 in which said sidewall includes a cylindrical segment forming said outlet opening and defining a minimum diameter of the spray hole, said segment having an axial length less than said minimum diameter, so that liquid is discharged from the hole in a divergent flow.

5. A shower pipe according to claim 2 in which the diffusing surface of each of the diffusing flange means is a concave, substantially parabolic surface.

6. A shower pipe according to claim 2 in which the diffusing surface of each of the diffusing flange means is a concave surface having a curved portion adjacent the spray outlet holes and a nearly straight end portion remote from the holes.

7. A shower pipe according to claim 1 in which the walls of said pipe comprise a fiberglass-reinforced plastic material.

8. A shower pipe according to claim 7 wherein at least one pair of opposed inside corners of said pipe have elongated reinforcing rods bonded thereto for stiffening said pipe.

9. A shower pipe according to claim 7 in which said pipe is composed of two similar channel-shaped half sections bonded together along mating flange surfaces to provide opposed stiffening flanges along opposite sides of said pipe.

10. A shower pipe according to claim 1 in which the pipe comprises four walls arranged to define a square cross section, both of said rows of holes being formed in one of said walls.

11. A shower pipe according to claim 1 in which the pair of diffusion flange means comprise a pair of continuous flanges.

12. A shower pipe for a rotary drum filter comprising:
    an elongate pipe of fiberglass-reinforced plastic for spanning the length of a filter drum;
    a spray outlet means extending axially of said pipe for spraying a liquid spray line from the pipe;
    a diffusion flange means depending from the pipe for diffusing the spray line axially of the pipe, the flange means joining the pipe adjacent the spray outlet means; and
    a pair of continuous fiberglass-reinforced plastic structural flange means extending axially along and in opposite directions from opposite sides of the pipe for stiffening the pipe;
    the structural flange means being offset circumferentially from the diffusion flange means so as to resist sagging of said pipe in different operative rotational positions of said diffusion flange means.

13. A shower pipe according to claim 12 in which the pipe is rectangular in cross section to define four walls, said diffusion flange means and said spray outlet means extending along one of said walls.

14. A shower pipe according to claim 13 including a pair of continuous axially-extending elongate internal reinforcing members secured within diagonally opposite inside corners of the pipe for stiffening the pipe, said reinforcing members being offset circumferentially from said pair of structural flange means.

15. A shower pipe according to claim 14 in which the reinforcing members are continuous strand glass reinforcing rods secured in each of the four inside corners of said pipe.

16. A shower pipe according to claim 13 in which the diffusion flange means includes a pair of said diffusion flange means depending from the same one of said walls in parallel, circumferentially spaced relationship and said spray outlet means comprises means defining two rows of spray holes, one row extending adjacent each of the pair of diffusion flange means, the holes of one row being offset axially from the holes of the other row.

17. A shower pipe according to claim 12 in which the pipe is divided lengthwise along said structural flange means into a pair of trough-like members, each structural flange means comprising a pair of parallel flanges for interconnecting the members continuously along their length to form said pipe.

18. A shower pipe according to claim 12 in which the diffusion flange means comprise a pair of continuous parallel flanges and the spray outlet means comprise means defining two rows of spray holes, one row adjacent each of said pair of flange means.

19. A shower pipe for a rotary drum filter comprising:

an elongated pipe for spanning the length of a filter drum, said pipe being composed of two similar channel-shaped fiberglass-reinforced plastic pipe sections bonded together along continuous mating flanges to define a pipe of square cross section with said mating flanges providing stiffeners on opposite sides of said pipe;

continuous elongated stiffening rods bonded to at least one pair of diagonally opposite inside corners of said pipe and offset circumferentially from said mating flanges;

means defining two parallel rows of spray holes extending axially along one wall of said pipe, the spray holes of one row being offset axially with respect to the spray holes of the other row;

a pair of parallel diffusion flange means extending axially along said one wall with one of said pair of diffusion flange means extending adjacent to each row of spray holes and adjacent to each spray hole in each row, such that a spray of liquid emitted from each spray hole is diffused axially of said pipe by a diffusion flange means;

the spacing between spray holes in each row and the axial offset of spray holes in one row relative to the other row being such that the two rows emit generally parallel lines of spray, with the lines in each row being axially separated from one another and the lines in one row overlapping axially the lines in the other row where the spray lines intersect the filter drum.

* * * * *